United States Patent
Dunn

(10) Patent No.: US 6,617,748 B2
(45) Date of Patent: Sep. 9, 2003

(54) MACHINE WITH CUP-SHAPED ARMATURE AND AIR GAP

(75) Inventor: Stanley E. Dunn, Boca Raton, FL (US)

(73) Assignee: Rush Holdings, Inc., Deerfield Beach, FL (US)

(*) Notice: Subject to any disclaimer, the term of this patent is extended or adjusted under 35 U.S.C. 154(b) by 0 days.

(21) Appl. No.: 09/888,636

(22) Filed: Jun. 20, 2001

(65) Prior Publication Data

US 2002/0067102 A1 Jun. 6, 2002

Related U.S. Application Data

(63) Continuation of application No. PCT/US99/30785, filed on Dec. 22, 1999.
(60) Provisional application No. 60/113,225, filed on Dec. 22, 1998.

(51) Int. Cl.$^7$ ................................................ H02K 1/22
(52) U.S. Cl. ........................................ 310/268; 310/266

(56) References Cited

U.S. PATENT DOCUMENTS

| | | | |
|---|---|---|---|
| 560,006 A | 5/1896 | Patin et al. ................ 310/165 |
| 3,467,845 A | * 9/1969 | Wesolowski ............... 310/168 |
| 4,100,443 A | 7/1978 | Kuwako .................... 310/169 |
| 4,188,556 A | * 2/1980 | Hahn ...................... 310/154.06 |
| 4,197,475 A | 4/1980 | Ban et al. ................. 310/203 |
| 4,349,761 A | * 9/1982 | Aoki ....................... 310/154.04 |
| 4,476,409 A | * 10/1984 | Fukami ................... 310/154.05 |
| 4,501,980 A | 2/1985 | Welburn ..................... 310/12 |
| 4,644,209 A | 2/1987 | Nozawa .................... 310/198 |
| 4,763,053 A | * 8/1988 | Rabe ....................... 310/180 |
| 4,900,965 A | 2/1990 | Fisher ..................... 310/216 |
| 4,924,128 A | 5/1990 | De Guelis et al. ........ 310/156.26 |
| 5,004,944 A | * 4/1991 | Fisher .................... 310/156.26 |
| RE33,628 E | 7/1991 | Hahn ........................ 310/268 |
| 5,081,388 A | 1/1992 | Chen ........................ 310/266 |
| 5,311,092 A | 5/1994 | Fisher ....................... 310/266 |
| 5,723,933 A | * 3/1998 | Grundl et al. ............. 310/208 |
| 5,731,645 A | 3/1998 | Clifton et al. ............... 310/74 |
| 5,783,894 A | 7/1998 | Wither ....................... 310/266 |
| 5,874,797 A | 2/1999 | Pinkerton ................. 310/156.25 |
| 6,064,135 A | * 5/2000 | Hahn .................... 310/154.06 |
| 6,075,297 A | * 6/2000 | Izawa et al. ................ 310/12 |

* cited by examiner

*Primary Examiner*—Dang Dinh Le
(74) *Attorney, Agent, or Firm*—Darby & Darby

(57) ABSTRACT

An electromechanical machine is disclosed which has a field producing assembly providing a cup-shaped air gap which is circumferentially disposed about an axis of rotation. The field assembly produces a circumferential distribution of magnetic flux in the cup-shaped air gap having n periodic extremes of flux density about the axis. A cup-shaped electrical assembly or armature is disposed in the air gap and the armature and field assembly are relatively rotatable. The armature has a circular array of C non-overlapping coils on each of its inner and outer faces with the coils on one face being angularly offset from the coils on the other face. Moreover, since the air gap and coils are cup-shaped, it is possible to achieve, for a machine of given diameter and form factor, a horsepower and torque which was previously possible only with substantially larger disk-type motors. That is because the total volume of the air gap and coils correspond to those of a much larger diameter disk-type motor.

21 Claims, 8 Drawing Sheets

MACHINE WITH CUP-SHAPED ARMATURE AND AIR GAP

CROSS-REFERENCE TO RELATED APPLICATIONS

This application is a con of PCT/US99/30785 filed Dec. 22, 1999. This application claims priority under 35 U.S.C. 119 based upon U.S. Provisional Application Ser. No. 60/113,225 filed Dec. 22, 1998, the entire disclosure of which is incorporated herein by reference.

FIELD OF THE INVENTION

The present invention relates generally to electro mechanical machinery, and more particularly, to an improvement to such machinery utilizing a disc-type electrical assembly, usually serving as an armature.

BACKGROUND OF THE INVENTION

Electric DC motors have experienced difficulty in finding acceptance in certain types of applications requiring a high operating torque, such as vehicles, lawn mowers and certain types of tools. Until the present invention, it was not possible to achieve sufficient torque and reasonable efficiency with a machine of sufficiently compact size. Efficiency is particularly important because of the relatively limited nature of the DC power source, typically a battery.

U.S. Pat. No. Re. 33,628 issued on Jul. 2, 1991, discloses a particularly efficient electro mechanical machine which has a field producing assembly, which serves as a stator and is mounted in a housing so as to define an axial air gap which is circumferentially disposed about an axis of rotation. The field assembly is structured to produce a circumferential distribution of magnetic flux in the air gap having P periodic extremes of flux density about the axis. A disc-shaped electrical assembly, serving as an armature is positioned in the air gap, and mounted so that the armature and field assembly are rotatable relative to each other. The armature has a circular array of C non-overlapping coils on each of its front and back faces, the coils on one face being angularly offset from the coils on the other face and each having the same arcuate extent, smaller than 360 degrees divided by P. The coils are arranged in groups of serially connected coils with each group occupying an unique area of an armature face. Inasmuch as adjacent coils are exposed to opposite extremes of the flux, they must have current flow in opposite directions. This is achieved by winding adjacent coils in opposite directions.

The present invention realizes improvements to the machine disclosed in U.S. Pat. No. RE 33,628 which substantially increases the torque and horsepower obtained with a machine of a given diameter and form factor. In accordance with the present invention, an electromechanical machine has a field producing assembly in a cup-shaped air gap which is circumferentially disposed about an axis of rotation. The field assembly produces a circumferential distribution of magnetic flux in the cup-shaped air gap having n periodic extremes of flux density about the axis. A cup-shaped electrical assembly or armature is disposed in the air gap and the armature and field assembly are relatively rotatable. The armature has a circular array of C non-overlapping coils on each of its inner and outer faces with the coils on one face being angularly offset from the coils on the other face. Moreover, since the air gap and coils are cup-shaped, it is possible to achieve, for a machine of given diameter and form factor, a horsepower and torque which was heretofore possible only with substantially larger disk-type motors. That is because the total volume of the air gap and coils correspond to those of a much larger diameter disk-type motor. The savings in cost, weight and size are significant, not to mention the more efficient use of energy.

BRIEF DESCRIPTION OF THE DRAWINGS

The foregoing and other features and advantages of the present invention will be understood more clearly from the following detailed description thereof when read in conjunction with the accompanying drawings, in which:

FIG. 4 consists of FIGS. 4A and 4B, wherein

DESCRIPTION OF THE PREFERRED EMBODIMENTS

Figure 1:
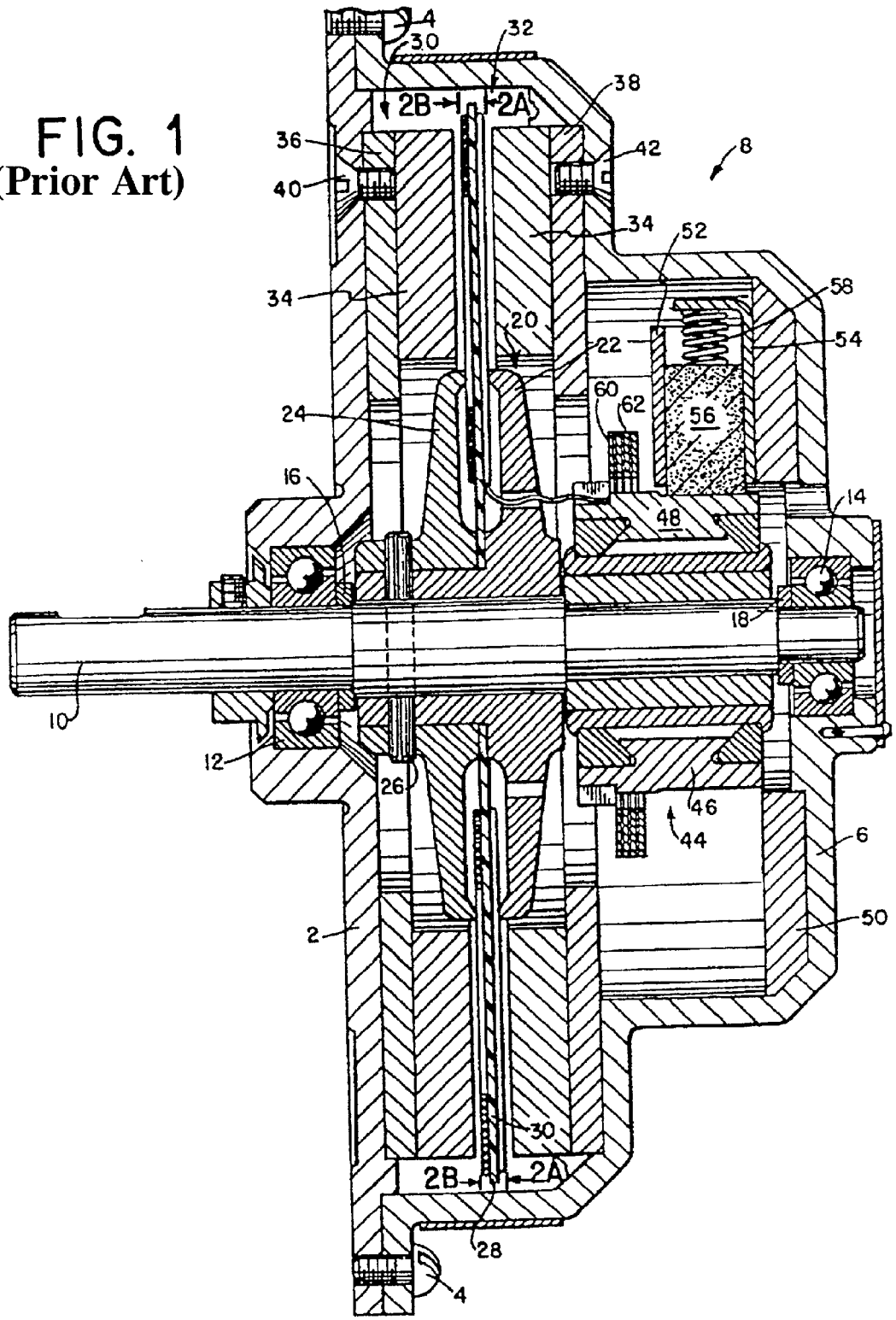
FIG. 1 is an axial, cross-sectional view of a prior art electromechanical machine utilizing a disk-type electrical member.

Turning now to FIG. 1, there is illustrated a cross-sectional side view of an electromechanical machine utilizing a disc-type armature of the same type as disclosed in U.S. Pat. No. RE 33,628. An understanding of this machine will be useful in understanding the overall structure of a machine in which the present invention would be utilized. A housing-half 2 is connected, by any conventional means, for example screws, one of which is indicated at 4, to another housing-half 6 to form the machine housing indicated generally at 8. Rotatably mounted within the housing 8 by means of front bearings 12 and rear bearings 14 is a shaft 10. Washers 16 and 18 are positioned between the shaft 10 and the front and rear bearings, respectively.

Within the housing 8 and mounted about the shaft 10 is an armature hub indicated generally at 20 which includes hub-half 22 and hub-half 24. The hub halves 22 and 24 are connected to one another and to the shaft so as to rotate therewith, as by a roll pin 26 passing through the two hub halves and the shaft 10. Suitably secured between the two hub halves 22 and 24 so as to rotate therewith is a disc-shaped rotor 28 made of a nonconducting, non-magnetic material, such as, for example, a phenolic. Secured to the rotor 28 as by adhesive or the like are a plurality of conducting wires forming armature coils 30, which will be more fully discussed below.

Fixedly connected to the machine housing 8 are first and second spaced field members, indicated at 30 and 32, which in the illustrative embodiment are stator members, but those skilled in the art will appreciate that the role of the stator and rotor are readily interchanged. Each of the stator members 30 and 32 includes a plurality of flat pie-segmented permanent magnets, indicated at 34, which may, for example, be constructed of ceramic ferrite. Each of the permanent magnets 34 is magnetized through its thickness, so one face is of one polarity and the other face of opposite polarity. The magnets may be fixedly secured to a metal backing plate in the form of a ring made as of soft iron or steel, the two back-up rings being indicated at 36 and 38, respectively. The two back-up rings are fixedly connected to the housing 8 by any conventional means, for example, by countersunk screws, indicated at 40 and 42, respectively. Alternatively, the stators may be formed of ceramic ferrite discs, suitably magnetized to form the field poles.

Fixedly connected to the shaft 10 and rotating therewith is a commutator indicated generally at 44. The commutator 44 includes a plurality of segments or bars of a conductive material, such as, for example, copper, suitably isolated from one another by, for example, mica. The commutator is, of course, also electrically isolated from the armature shaft 10 on which it is mounted. Two of the copper bars of the commutator are indicated at 46 and 48. Fixed to the rear housing 6 is a brush holder mount 50 to which is attached a brush holder 52 and a brush holder clip 54. A brush 56 is positioned between the brush holder 52 and the brush holder clip 54 and is maintained in electrical contact with the commutator bar 46 by a spring 58 positioned between the brush 56 and the brush holder clip 54. Other brushes, as needed, are similarly mounted in relation to the commutator.

The permanent magnets 34 of the stator may advantageously be made of a ceramic ferrite and the back-up ring may be made of a magnetic material such as a soft iron or steel. It should be noted that the magnets 34 may be adhered, by means of an elastic cement, for example, to the soft steel back-up ring before the stator is magnetized.

It is further noted that the individual pole pieces have a pie-segmented configuration so that the pole area for each is maximized. It is also possible to utilize a continuous ring of ceramic ferrite, magnetizing adjacent sections in alternate polarity, although this is less desirable since such a continuous ceramic ferrite structure is frangible and subject to breakage, even when adhered by means of an elastic glue to the magnetic back-up ring. Utilizing individual pie-segmented pole pieces is preferable since there is some reduction in total pole area and substantial reduction in the likelihood of stator breakage.

In the embodiment discussed above, the number P of magnetic field poles in the machine is equal to the number of extremes of flux density (of either polarity) in the gap through which the armature rotates. As defined in this specification, the term "flux density extreme" refers to the maxima and minima (i.e., the crests and valleys) on a graph of flux density versus rotational angle in the air gap (as a circular path is traveled about the axis). It will be appreciated that the maximum and minimum values of flux density in the above-described embodiment occur respectively at the mid-points of the north and south poles, where the north poles have been arbitrarily assigned a positive flux density and the south poles a negative flux density. In such a graph, the maxima (or crests) occur at the greatest positive values of flux density (i.e., the north poles), and the minima (or valleys) occur at the greatest negative values of flux density (i.e., the south poles). As such, the number P of extrema in the embodiment being discussed is equal to the number of pairs of opposed magnets 34 on the field members 30 or 32. However, it should be noted that the number P of flux density extrema in other embodiments need not equal the actual number of magnets or magnet pairs.

In summary, the disclosed field producing assembly, which here serves as a stator, defines an axial air gap which is circumferentially disposed about an axis of rotation and is constructed to produce a circumferential distribution of magnetic flux in the air gap having P periodic extremes of flux density about the axis.

Figure 2A:
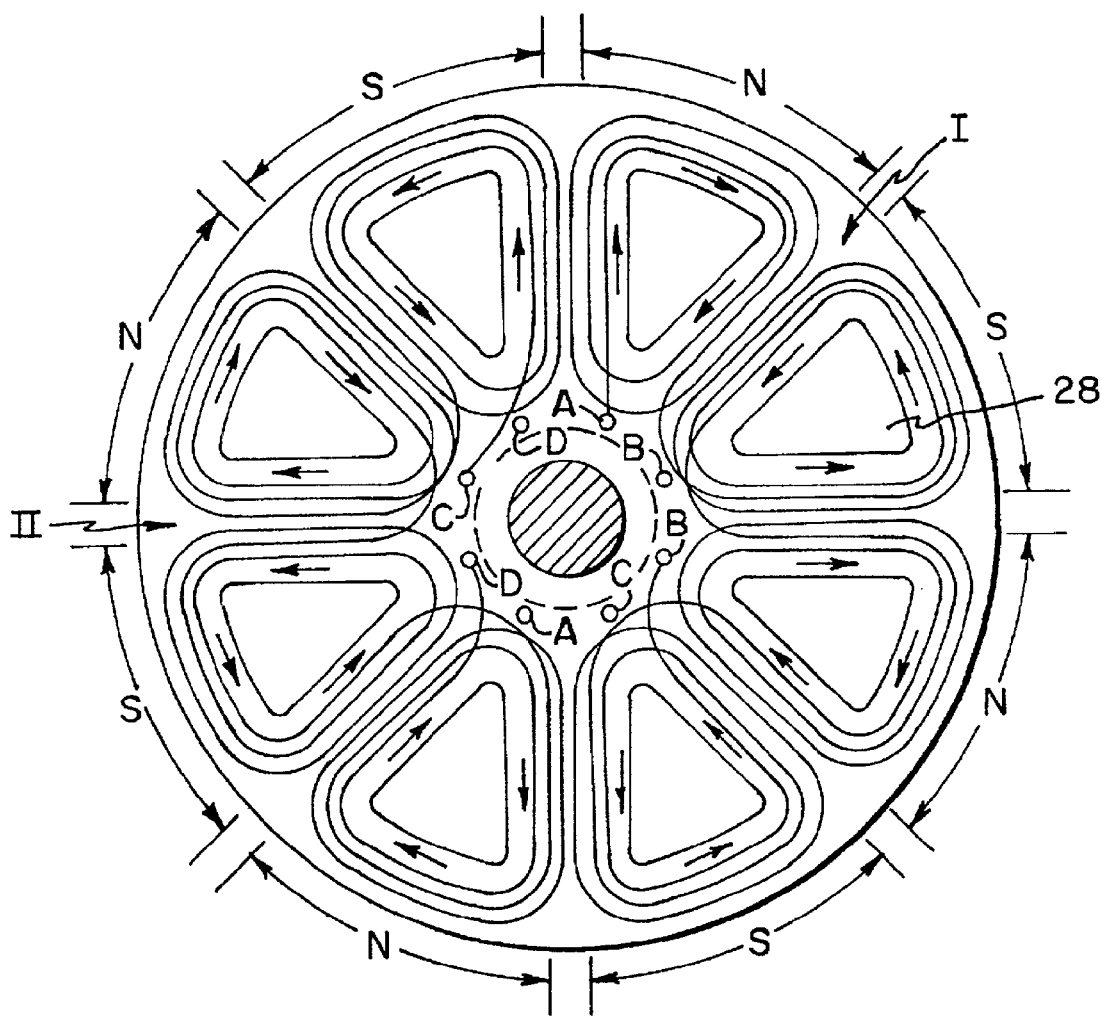
FIGS. 2A and 2B illustrate the two sides of an electrical member utilized in the prior art machine.
Figure 2B:
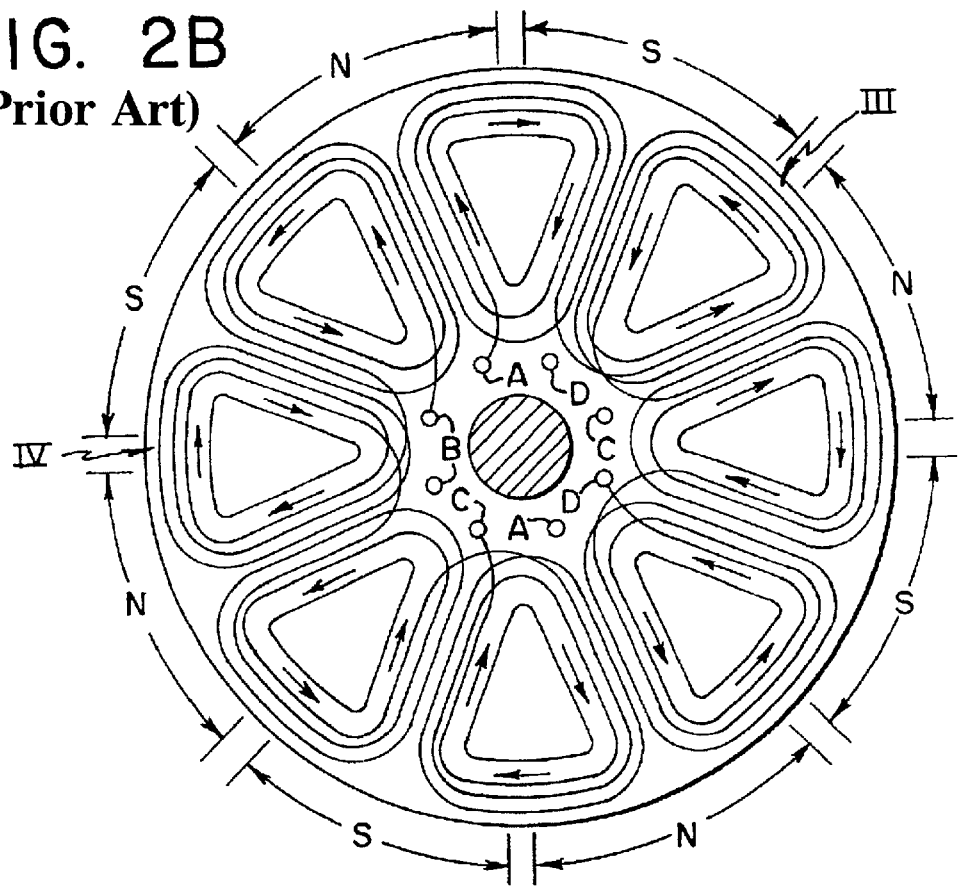

Turning now to FIGS. 2A and 2B, there are illustrated the two sides of a winding pattern for an eight-pole electrical member including four groups of armature coils, serving as a rotor, in accordance with patent RE No. 33,628. It will be noted that in this illustration four wires are utilized, each wire forming a series group of coils on one-half of each face of the rotor disc 28.

As seen in FIG. 2A, on the front face of the rotor one wire forms the four right-hand coils, and extends from a point A successively through four coils to point B. A second wire extends from point C successively through four coils to point D. The coils are arranged so that current will flow in the same direction through the side-by-side conductors of adjoining coils. In other words, the winding direction is reversed on adjacent coils. On the rear face of the rotor, as seen in FIG. 2B, the coils are staggered 90 electrical degrees (one-half of the pitch angle of the stator poles) clockwise with respect to those on the front face. It should be understood that the rotor in FIG. 2B is depicted in relation to the same magnetic poles shown in FIG. 2A but which are reversed in the rear view. On this rear face, one wire starts at point B and extends through four successive coils to point C, while a further wire starts at point A and extends through four successive coils to point D. As shown below, points A, B, C, D are connected to respective sets of commutator segments. By winding each group of coils from a single piece of wire, a maximum of 8 connections to the commutator becomes necessary, regardless of the number of field poles.

In summary, the disc-shaped electrical assembly, here serving as an armature, is positioned in the air gap, and mounted so that the armature and field assembly are rotatable relative to each other. The armature has a circular array of C non-overlapping coils on each of its front and back faces, the coils on one face being angularly offset from the coils on the other face and each having the same arcuate extent, smaller than 360 degrees divided by P.

Figure 3:
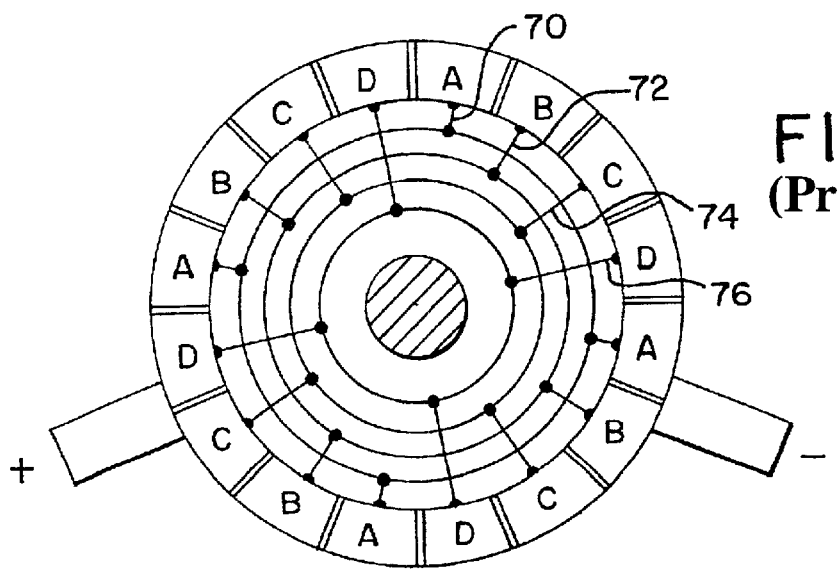
FIG. 3 is a schematic diagram of a commutator arrangement for use with the electrical member or armature of FIGS. 2A and 2B.

Turning now to FIG. 3, there is illustrated a schematic diagram of a commutator for use with the armature illustrated in FIGS. 2A and 2B. Commutator 44 is arranged to have twice as many segments or bars as there are field poles. In this illustration there are four segments for each pair of stator poles and every fourth one of the sixteen segments forming the commutator (i.e., those indicated by the respective letters A, B, C and D) are electrically connected to one another by respective conductors, indicated at 70, 72, 74 and 76. Such connectors may be readily made by use of stamped jumper rings 62 (FIG. 1). The commutator segments A, B, C, D are respectively connected to points A, B, C, D on the rotor windings of FIGS. 2A and 2B. The index markings in FIGS. 2A, 2B and 3 are utilized to enable the appropriate alignment of the commutator, the armature and the stator for maximum efficiency of operation of the machine. The maximum brush width is preferably approximately 60% to 90% of the commutator bar width. Although such an arrangement gives a varying resistance as the armature rotates, the torque remains quite stable.

The two commutator brushes are positioned at an angle such that one brush straddles segments A-B when the other straddles segments D-C. If there are N pole pairs, then the brush separation is $(n+\frac{1}{2})(360°/N)$, where n is any integer from zero to N. For higher currents, several pairs of brushes may be used, each additional pair being spaced from the first pair by 90° or a multiple thereof. Since brushes spaced by such intervals will contact inter-connected segments, such brushes may be connected in parallel. This not only permits larger currents and power, but reduces commutator arcing and ring fire.

Figure 4A:
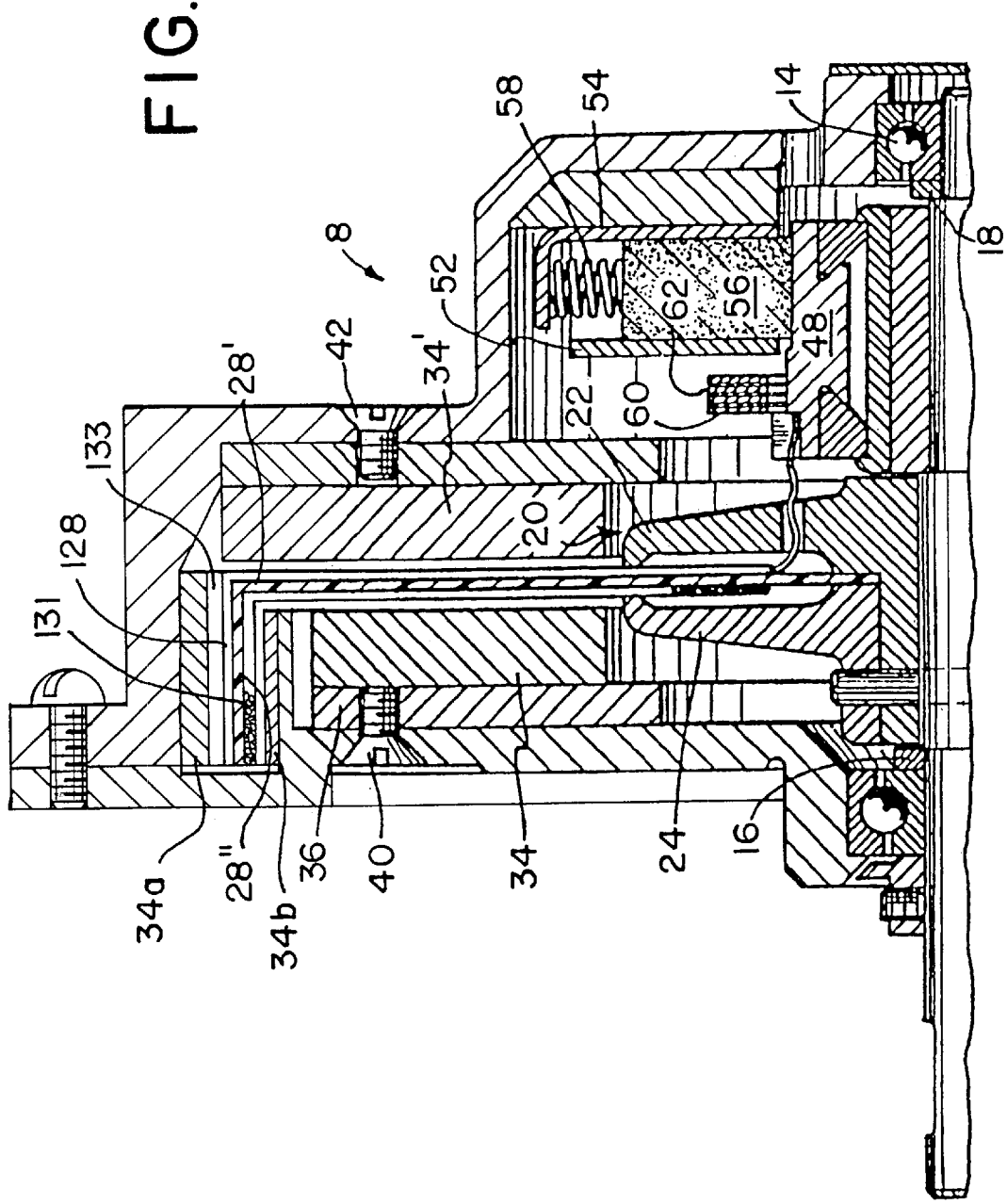
FIG. 4A is an axial, cross-sectional view of the upper half of an electro mechanical machine embodying the present invention.
Figure 4B:
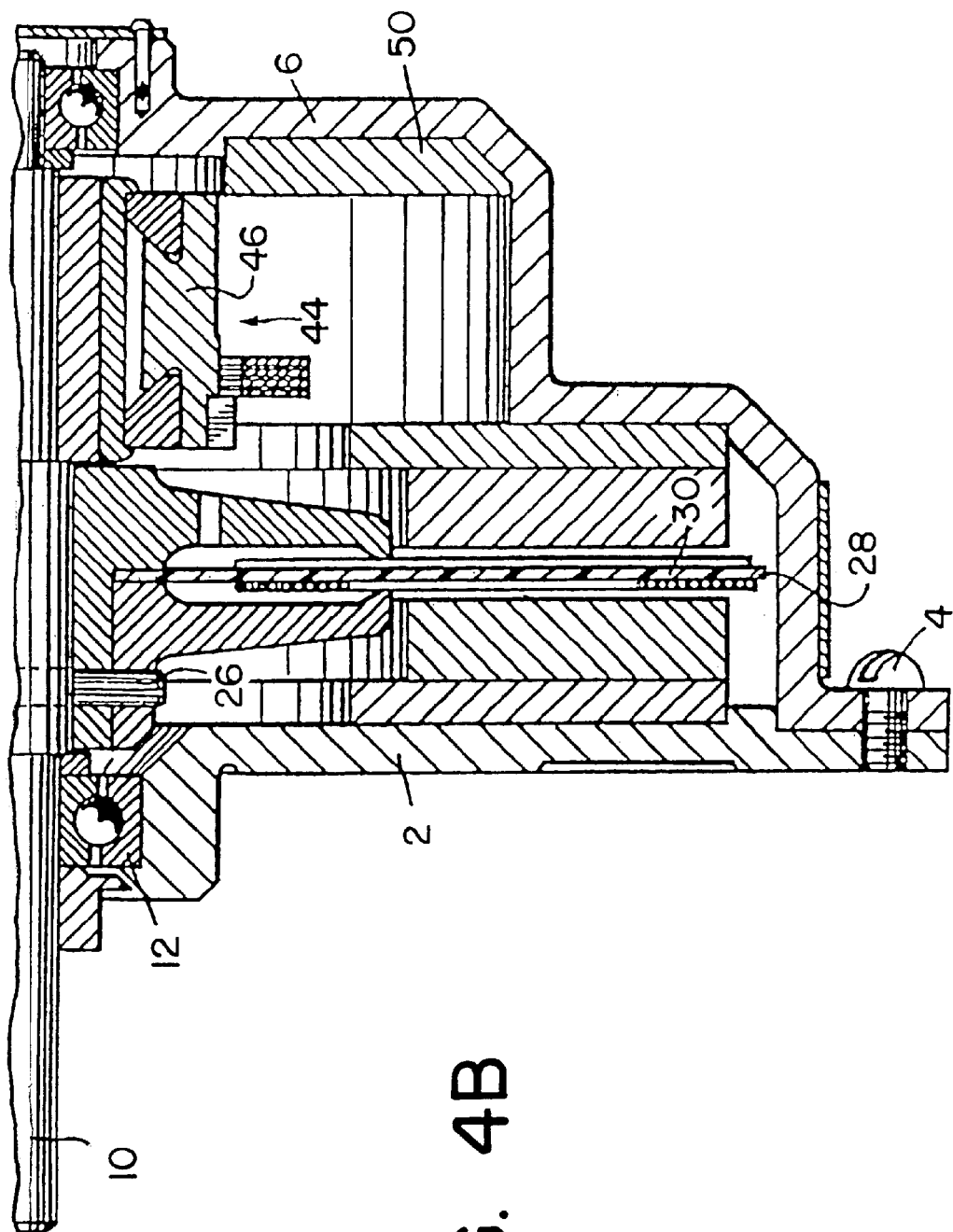
FIG. 4B is the bottom half of the machine of FIG. 1, to illustrate the two machines on the same scale.

FIG. 4A is the upper half of a sectional side view of an electro mechanical machine embodying the present invention, and the FIG. 4B is the same as the lower half of FIG. 1, but on the same scale as FIG. 4A. This means that the machine represented by FIG. 4A is essentially the same size and has essentially the same form factor as the machine of FIG. 4B (FIG. 1). For convenience of description, elements in FIG. 4A which are essentially identical to those in FIG. 1 bear the same reference characters and operate in the same manner. Accordingly, only the differences between FIG. 4A and FIG. 1 will be described.

In FIG. 4A, the rotor or electrical assembly 128 is generally cup shaped, being made up of a disk portion 28' and a cylindrical, flange portion 28". In comparison to rotor 28 of FIG. 1, the disk portion 28' of rotor 128 has a somewhat larger diameter and the magnets 34' are correspondingly lengthened in their radial direction. In addition, additional magnets 34a and 34b are provided on either side of the cylindrical flange portion 28'. The magnetic orientation of magnets 34a is the same as magnets 34' and magnets 34b have the same magnetic orientation as magnets 34, except both magnets 34a and 34b are rotated 90° counterclockwise (in FIG. 4A). Thus, the magnets 34a, 34' and 34b, 34 define a cup-shaped magnetic field in the cup-shaped gap 133 therebetween, in which gap the rotor 128 is located.

Figure 6:
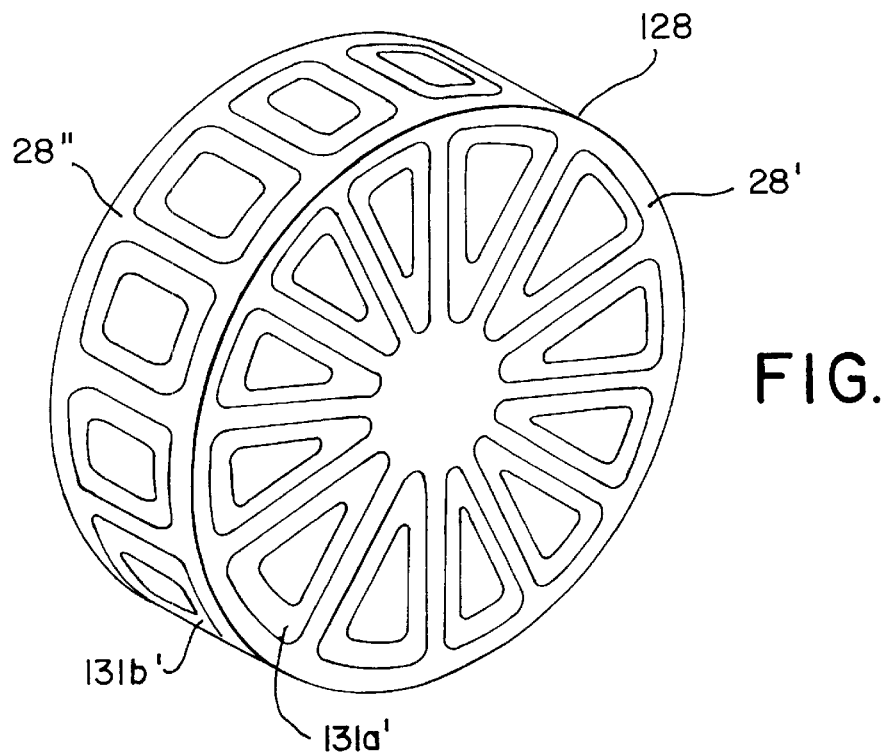
FIG. 6 is a schematic, perspective view of an armature in accordance with the present invention incorporating an alternate form of coil.
Figure 5:
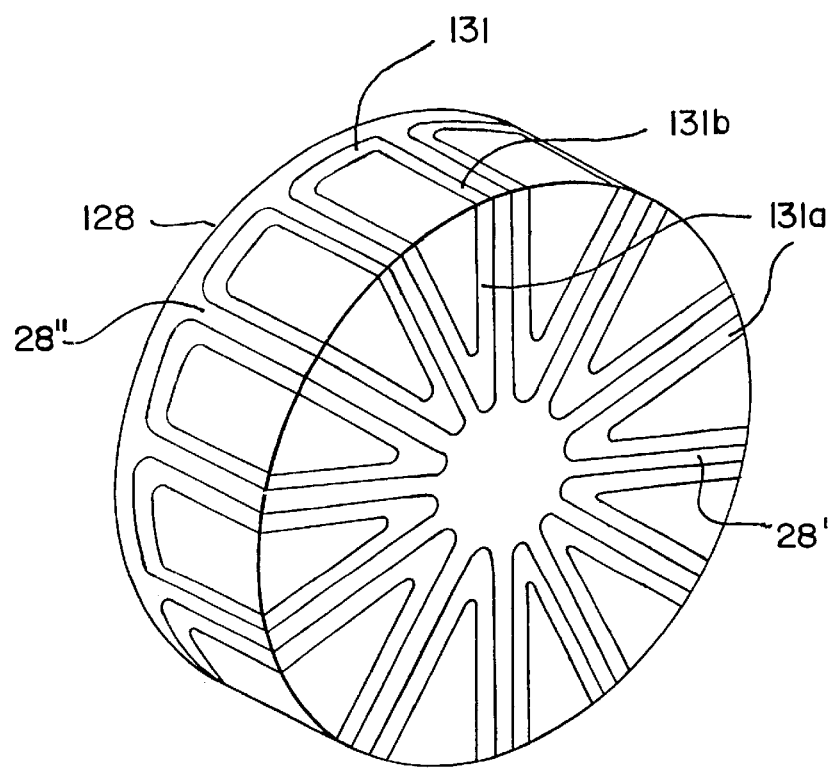
FIG. 5 is a schematic, perspective view of an armature in accordance with the present invention incorporating a preferred form of coil.

It should be appreciated that rotor 128 could be provided with coil arrangements similar to those shown in FIGS. 2A and 2B on its inner and outer surfaces, respectively and that those coil arrangements could be commutated in the same manner shown in FIG. 3. However, the coils themselves need to have a somewhat different configuration. FIG. 5 is a perspective schematic diagram illustrating a presently preferred construction for the coils 131 on rotor 28. It should be appreciated that rotor 128 has coils on both its inner and outer surfaces and that the coils of the inner surface are rotationally displaced by one-half coil width, as was the case in FIGS. 2A and 2B. Each coil, 131, now has an elongated wedge shape made up a triangular inner portion 131a and a parallel-sided upper portion 131b. Moreover, each coil is bent into an L-shape so that the inner portion 131a extends along the portion 28' of rotor 128 and portion 131b extends along the flange portion 28" of the rotor. FIG. 6 illustrates an alternate embodiment 131' for the coils 131. In this case each coil 131 is made up of a wedge-shaped coil 131a' and a rectangular coil 131b', which are connected to conduct simultaneously. The coils 131a' are identical to the coils in FIGS. 2A and 2B, while the coils 131b' are simple rectangular coils on the surface of flange portion 28". In each case, a coil 131a' and its corresponding 131b' will conduct simultaneously.

Figure 7:
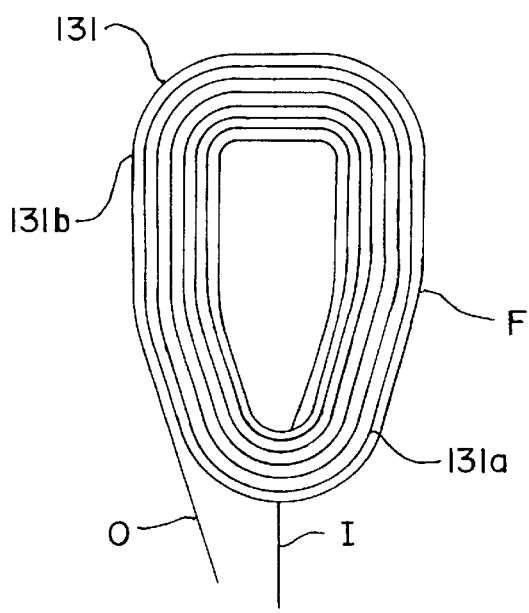
FIG. 7 is a plan view of the preferred form of coil.
Figure 8:
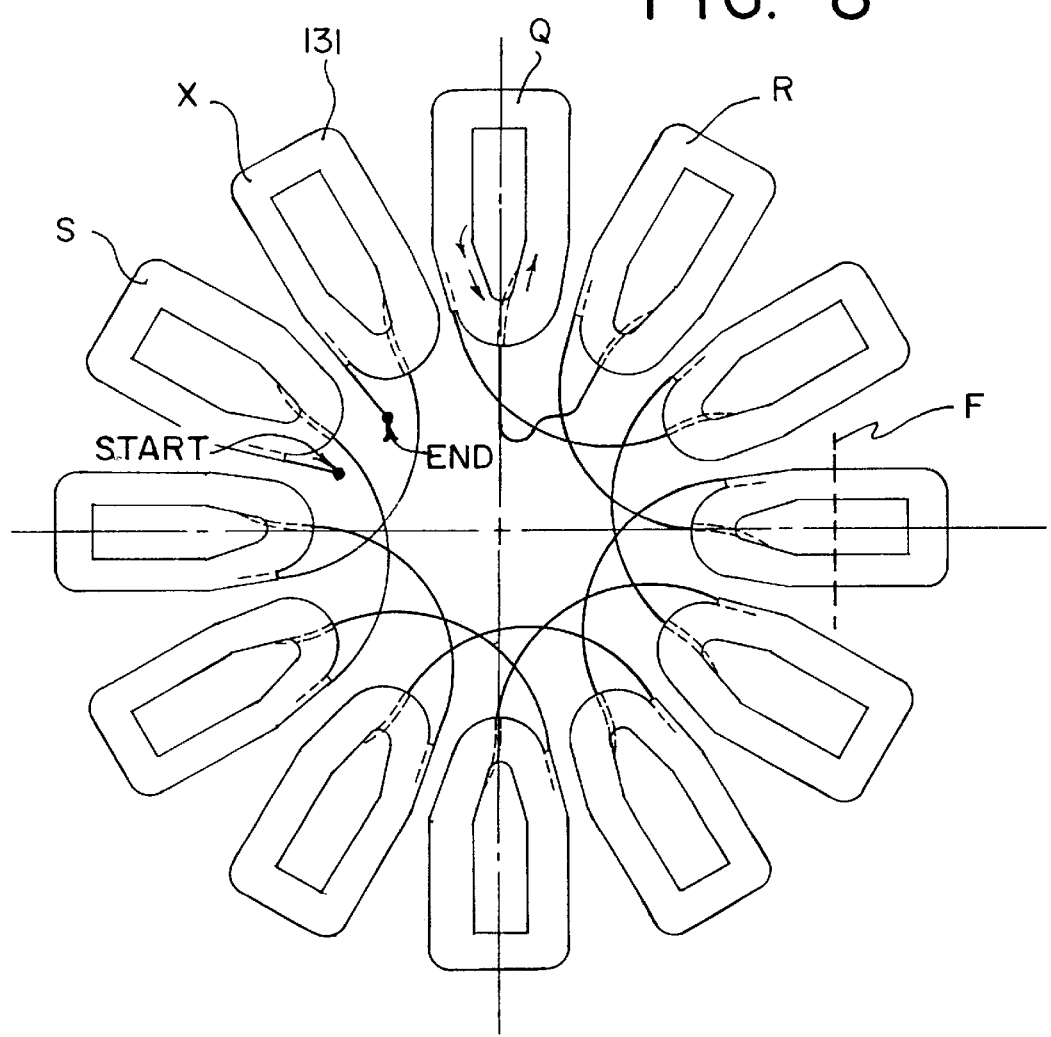
FIG. 8 is a schematic diagram illustrating a typical winding pattern for use with the preferred form of coil, showing an exemplary arrangement with twelve coils on a face.

FIG. 7 illustrates the construction of one of the coils 131. These are preferably wound flat, with non-overlapping windings, and then bent into an L-shape along Line F. FIG. 8 is a schematic illustration of how an entire group of coils on one face of rotor 128 would be wound. All of the coils are wound in the same direction, for example, counterclockwise, as illustrated in FIG. 7. Beginning with a starting coil S, alternate coils are connected in a counterclockwise direction (i.e. the adjacent coil is skipped) by connecting the inner lead I of a coil to the outer lead O of the next coil, until the coil Q is reached, which would have been connected to the coil S if this continued. At that point Lead I of coil Q is connected to Lead I of the Coil Q is connected to Lead I of the Coil R, which is next adjacent to the clockwise direction. Thereafter, the Lead O of a coil is connected to Lead I of the next coil while moving in a clockwise direction and connecting alternate coils, until the coil X is reached. This procedure results in a coil pattern in which all of the coils are in series, but adjacent coils conduct in opposite directions.

Figure 9:
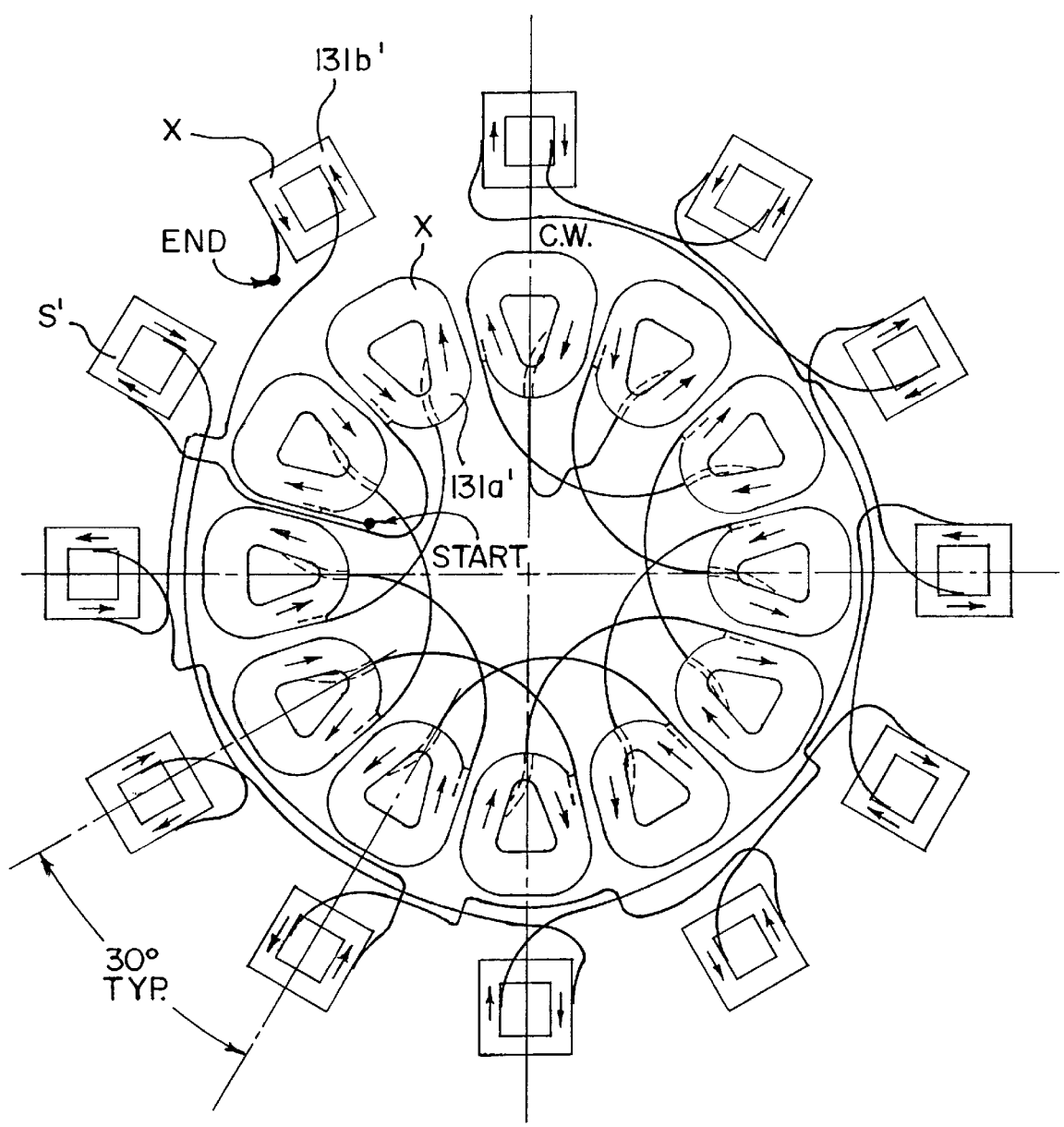
FIG. 9 is a schematic diagram illustrating a typical winding pattern for use with the alternate form of coil, showing an exemplary arrangement with twelve coils on a face.

FIG. 9 illustrates a preferred winding pattern for the two-part coils 131'. In this case coils 131a' are wound in a pattern similar to that shown in FIG. 8, ranging from coil S to coil X. Thereafter, the rectangular coils 131b' are wound in series, starting with coil S' which is directly in series with coil X. The same winding pattern is then followed for coils 131b' as was followed for coils 131a'. This produces a winding pattern in which all of the coils are in series, whereas adjacent coils 131a' induct in opposite direction, adjacent coils 131b' conduct in opposite directions, and corresponding ones of coils 131a' and 131b' conducted in the same direction.

From the preceding description, it should be appreciated that the winding patterns described with respect to FIGS. 8 and 9 involve the use of a single pair of connecting wires to each side of the rotor This will allow the machine, for example a motor, to have a relatively low speed with a relatively high torque.

Summarizing the preceding description, an electromechanical machine has been described in which the field producing assembly, which serves a stator defines a cup-shaped air gap which is circumferentially disposed about an axis of rotation. The field assembly produces a circumferential distribution of magnetic flux in the cup-shaped air gap having n periodic extremes of fluxes density about the axis. A cup-shaped electrical assembly or armature is disposed in the air gap and the armature and field assembly are relatively rotatable. The armature has a circular array of C non-overlapping coils on each of its inner and outer faces with the coils on one face being angularly offset from the coils on the other face. Moreover, since the air gap and coils are cup-shaped, it is possible to achieve, for machine of a given diameter and form factor, a horsepower and torque which was previously possible only with substantially larger motors. That is because the total volume of the air gap and coils correspond to those of a much larger diameter disk-type motor. For example, with a motor of a given diameter and form factor, an improvement of 20 to 40 percent in horsepower and torque can be expected by utilizing a cup-shaped air gap and electrical member.

Although a preferred embodiment of the invention has been disclosed for illustrative purposes, those skilled in the art will appreciate that many additions, modifications and substitutions are possible without departing from the scope and spirit of the invention.

I claim:

1. An electro-mechanical machine, comprising:
a field producing assembly having a cup-shaped air gap which is circumferentially disposed about an axis of rotation, a portion of the air gap remote from the axis extending in a direction lateral to the remainder of the air gap, the field producing assembly producing a circumferential distribution of magnetic flux in the cup-shaped air gap having N periodic extremes of flux density about the axis, the field producing assembly having a portion producing a substantially radial field and a portion producing a substantially axial field, both portions producing a field above a leakage level; and
a cup-shaped electrical assembly disposed in the air gap and including a circular array of C non-overlapping coils on one of an inner and outer face of the electrical assembly;
the field producing and electrical assemblies being mounted so as to be relatively rotatable about said axis of rotation.

2. The machine of claim 1 comprising a circular array of C non-overlapping coils on each of an inner and outer face of the electrical assembly with the coils on one face being angularly offset from the coils on the other face.

3. The machine of claim 2 wherein each coil extends over two angularly disposed surfaces of said electrical assembly.

4. The machine of claim 1 wherein each coil extends over two angularly disposed surfaces of said electrical assembly.

5. The machine of claim 4 wherein each coil is generally L-shaped in profile.

6. The machine of claim 4 wherein said coils are constructed so that each coil is wound to conduct current in an opposite rotational sense relative to a next adjacent coil.

7. The machine of claim 1 wherein said air gap includes a generally disk shaped region to which said axis is generally perpendicular and a region which is generally cylindrical about said axis.

8. The machine of claim 1 wherein said electrical assembly includes a generally disk-shaped portion to which said axis is generally perpendicular and a portion which is generally cylindrical about said axis.

9. An electro-mechanical machine, comprising:
a field producing assembly having a cup-shaped air gap which is circumferentially disposed about an axis of rotation, the field producing assembly producing a circumferential distribution of magnetic flux in the cup-shaped air gap having N periodic extremes of flux density about the axis;
a cup-shaped electrical assembly disposed in the air gap and including a circular array of C non-overlapping coils on one of an inner and outer face of the electrical assembly;
the field producing and electrical assemblies being mounted so as to be relatively rotatable about said axis of rotation; and
a first subset of C coils circularly disposed on one of two angularly disposed surfaces of said electrical assembly and a second subset of C coils cylindrically disposed on the other of said two surfaces, each coil in the first subset being axially aligned with a corresponding coil in the second subset.

10. The machine of claim 9 wherein subsets of coils are constructed so that each coil in a subset is wound so as to conduct current in an opposite rotational sense relative to a next adjacent coil in the same subset and corresponding coils in different subsets are wound so as to conduct current in the same rotational sense.

11. An electro-mechanical machine, comprising:
a field producing assembly having a cup-shaped air gap which is circumferentially disposed about an axis of rotation, the field producing assembly producing a circumferential distribution of magnetic flux in the cup-shaped air gap having N periodic extremes of flux density about the axis;
a cup-shaped electrical assembly disposed in the air gap and including a circular array of C non-overlapping coils on one of an inner and outer face of the electrical assembly;
the field producing and electrical assemblies being mounted so as to be relatively rotatable about said axis of rotation; and
said field producing assembly comprises N circumferentially spaced magnet subassemblies disposed on one side of said air gap, each magnet subassembly being generally L-shaped in a cross-section taken through said axis and being magnetically polarized opposite to a next adjacent magnet subassembly in a direction normal to the air gap.

12. The machine of claim 11 wherein said field producing assembly comprises N circumferentially spaced magnet subassemblies disposed on either side of said air gap, each magnet subassembly being generally L-shaped in a cross-section taken through said axis and being magnetically polarized opposite to a next adjacent magnet assembly in a direction normal to the air gap, the magnet subassemblies on opposite sides of the air gap being circumferentially aligned, and each magnet subassembly being magnetically polarized opposite to an opposed magnet subassembly in a direction normal to the air gap.

13. The machine of claim 11 comprising a circular array of C non-overlapping coils on each of an inner and outer face of the electrical assembly with the coils on one face being angularly offset from the coils on the other face.

14. The machine of claim 13 wherein each coil extends over two angularly disposed surfaces of each electrical assembly.

15. The machine of claim 13 comprising a first subset of C coils circularly disposed on one of two angularly disposed surfaces of said electrical assembly and a second subset of C coils cylindrically disposed on the other of said two surfaces, each coil in the first subset being axially aligned with a corresponding coil in the second subset.

16. The machine of claim 11 wherein each coil extends over two angularly disposed surfaces of said electrical assembly.

17. The machine of claim 16 wherein each coil is generally L-shaped in profile.

18. The machine of claim 16 wherein said coils are constructed so that each coil is wound to conduct current in an opposite rotational sense relative to a next adjacent coil.

19. The machine of claim 11 comprising a first subset of C coils circularly disposed on one of two angularly disposed surfaces of said electrical assembly and a second subset of C coils cylindrically disposed on the other of said two surfaces, each coil in the first subset being axially aligned with a corresponding coil in the second subset.

20. The machine of claim 19 wherein subsets of coils are constructed so that each coil in a subset is wound so as to conduct current in an opposite rotational sense relative to a next adjacent coil in the same subset and corresponding coils in different subsets are wound so as to conduct current in the same rotational sense.

21. An electro-mechanical machine, comprising:
a field producing assembly having a cup-shaped air gap which is circumferentially disposed about an axis of rotation, the field producing assembly producing a circumferential distribution of magnetic flux in the cup-shaped air gap having N periodic extremes of flux density about the axis;

a cup-shaped electrical assembly disposed in the air gap and including a circular array of C non-overlapping coils on one of an inner and outer face of the electrical assembly;

the field producing and electrical assemblies being mounted so as to be relatively rotatable about said axis of rotation; and a circular array of C non-overlapping coils on each of an inner and outer face of the electrical assembly with the coils on one face being angularly offset from the coils on the other face; and a first subset of C coils circularly disposed on one of two angularly disposed surfaces of said electrical assembly and a second subset of C coils cylindrically disposed on the other of said two surfaces, each coil in the first subset being axially aligned with a corresponding coil in the second subset.

* * * * *